G. L. BURLINGAME.
GAS SHUT-OFF VALVE.
APPLICATION FILED MAY 19, 1913.
1,154,561.
Patented Sept. 21, 1915.
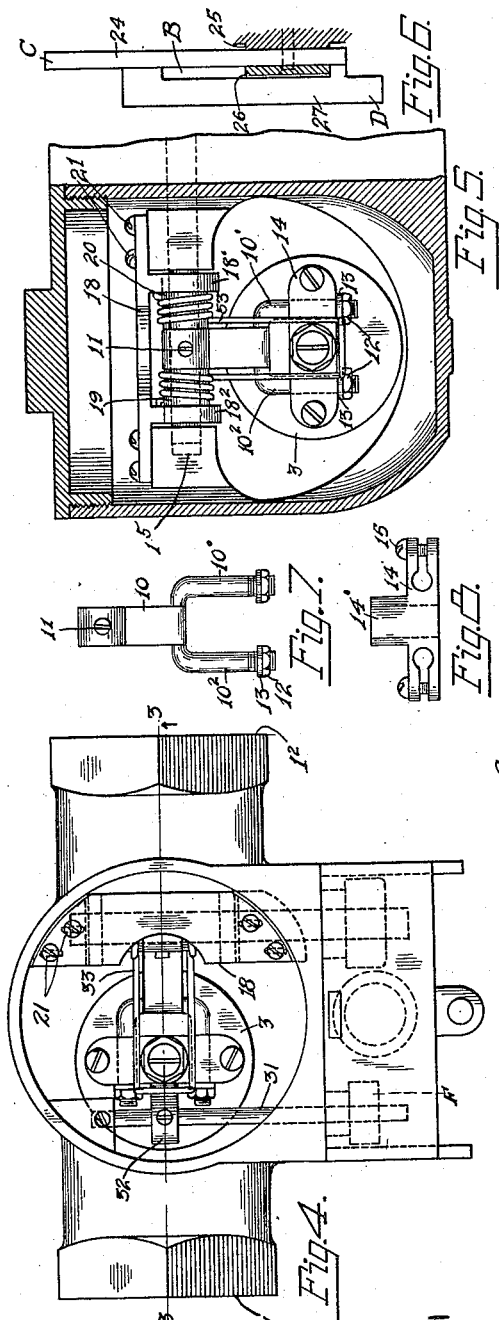
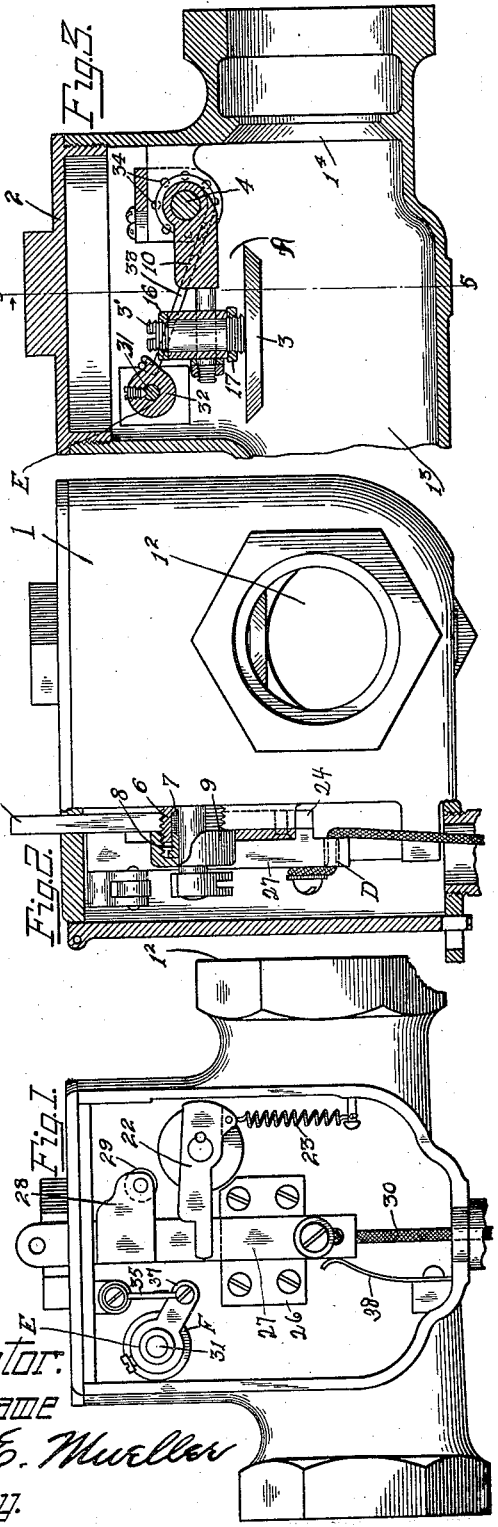
Witnesses:
Inventor:
George L Burlingame
By George E. Mueller
Attorney.

UNITED STATES PATENT OFFICE.

GEORGE L. BURLINGAME, OF CHICAGO, ILLINOIS.

GAS-SHUT-OFF VALVE.

1,154,561.   Specification of Letters Patent.   Patented Sept. 21, 1915.

Application filed May 19, 1913.   Serial No. 768,632.

*To all whom it may concern:*

Be it known that I, GEORGE L. BURLINGAME, a citizen of the United States of America, residing in Chicago, county of Cook, and State of Illinois, have invented certain new and useful Improvements in Gas-Shut-Off Valves, of which the following is a specification.

My invention in general relates to shut-off valves, and is directed more particularly to valves which may be automatically or manually closed. That is valves which may be closed manually by a lever or like part, or automatically when a fuse is ruptured.

One of the objects of my invention is to provide an improved form of valve having manual and automatic closing means independent of each other, and a further object is to provide certain improved forms of construction which will be more particularly pointed out in the ensuing specification and claims, and accompanying drawing in which:

Figure 1 is a side elevation of my valve with the outside cover removed showing the external valve operating mechanism in position with the valve open; Fig. 2 is a right end view of Fig. 1 but with the mechanism box broken away; Fig. 3 is a section along the line 3—3 of Fig. 4 showing the interior mechanism and with the valve in its normal or open position; Fig. 4 is a top view of Fig. 1 but with the valve cap removed; Fig. 5 is a cross sectional view along line 5—5 of Fig. 3 but with the valve shown in its closed or operated position; Fig. 6 is a detail view of the main slide bar or manually operating means; Fig. 7 is a detail view of the valve carrying arm; and Fig. 8 is a detail view of the valve adjusting bridge member.

Referring now more particularly to the detail construction, my valve comprises a casing 1 having an inlet $1^1$ and outlet $1^2$. A central chamber $1^3$ is provided and a cap 2 is threaded into casing 1 so as to provide a large opening for access to the valve interior.

A valve of any type may be provided but I preferably use a so-called fly-valve A having a swinging gate 3 supported by a rotatable shaft 4, said gate 3 being adapted to set in the valve seat $1^4$.

The shaft 4 of the gate mechanism A is supported at one end in a bearing $1^5$, the other end of said shaft 4 extending through a packed bearing 6 of any suitable construction, the form shown being preferable. In Fig. 2 said bearing 6 is partially broken away to show the packing 7, packing ring 8, and lock nut 9.

A valve carrying arm 10 (Fig. 7) is securely fastened to shaft 4 by a set screw 11, said arm 10 having bifurcated ends $10^1$, $10^2$ which are threaded to receive nuts 12 and washers 13. An adjustable gate support 14 (Fig. 8) is carried by ends $10^1$, $10^2$ and clamped to said ends by screws 15. The nuts 12 may be used to adjust the gate laterally with respect to shaft 4 so as to register with the valve seat $1^4$. The valve gate 3 has a stud $3^1$ extending through the hole $14^1$ and a lock nut 16 is threaded to the free end of the stud $3^1$, while a lock nut 17 is threaded next to the gate 3. Said nuts 16—17 are adapted to clamp against member 14 to securely hold the gate. I also provide means for transversely adjusting said gate 3 with respect to said lateral adjustment, said means comprising a bridge 18 secured by means of screws 21 which extend through slotted openings shown by dotted lines in Fig. 4. Said bridge 18 has depending lugs $18^1$—$18^2$ which securely support tubes 19, 20, these tubes being preferably clear of shaft 4 and resting against arm 11 so as to prevent longitudinal movement of shaft 4. It will be seen that when screws 21 are loosened, bridge 18 may be moved so as to adjust said gate 3 transversely to register with seat $1^4$.

When the gate 3 is properly adjusted, nuts 16, 17 may be loosened and a screw driver or other suitable tool connected to valve stud $3^1$ to rotate the gate and grind it to its seat. After grinding the gate the nuts are locked to securely hold the gate.

The valve A may be held in its normal or open position by any suitable means, but I preferably employ spring means, using a spring 23 which is attached to an arm 22 carried by shaft 4. It will be apparent that a weight properly carried by shaft 4 would also serve to hold the valve open in place of the spring 23.

When operating the valve manually, a manually operable member B (Fig. 6) is employed to act upon arm 22, said member B comprising preferably bar 24 slidingly mounted in a slotted lug 25, capped by a plate 26 which holds the bar 24 to permit reciprocation thereof. A second bar 27 is securely fastened to bar 24 in a suitable manner, said bar 27 carrying a block 28 which supports a roller 29 in such a manner that when member B is moved downwardly the roller 29 engages arm 22, moving it downwardly and thus closing the valve.

Member B is arranged to be connected at the end D with a cord as 30 or at the end C with a suitable rigid connection, whereby the member B may be pushed by the rigid connection or pulled by the flexible connection.

If the valve has been closed manually, upon restoring member B, the valve gate 3 is opened by its restoring spring 23.

Now as to the automatic closing means, for this purpose I preferably employ an independent device E comprising a shaft 31 suitably journaled and provided with a packed bearing F (shown by dotted lines) similar in construction to packed bearing 6 of shaft 4. A spring holding arm 32 is rigidly fastened to shaft 31 and is adapted to hold the valve closing spring 33 normally free of the valve gate. An arm 37 is also secured to shaft 31, and a fuse 35 is fastened at one end to said arm 37 and at its other end to casing 1. The fuse 35 thus holds the automatic closing means against actuation. The spring 33 is wound around the sleeves 19, 20, so as not to interfere with the free manual operation of the valve. The free ends of spring 33 are adapted to rest in holes 34 in the proper position to give the spring 33 a suitable tension.

In order to hold the manually operable device B normally clear of the valve gate and thus insure no interference, a leaf spring 38 is provided which presses against the side of bar 27 thus yieldingly holding the device B but permitting a ready operation thereof.

Now as to the automatic operation of the valve, when the fuse 35 is ruptured by an excessive heat or otherwise, the spring 33 is released and moves against the bridge 14, said spring continuing in its movement to close the valve. To again open the valve, the spring 33 is moved upward to be engaged by arm or hook 32 after which a fuse is again fastened in place to hold the valve closing spring 33 against actuation.

While I have shown a preferred embodiment of my invention it will be understood that many changes and modifications will readily suggest themselves and I aim to cover all such changes and modifications as come within the spirit and scope of the appended claims.

What I claim as new and desire to secure by Letters Patent is:

1. A shut-off valve comprising a gate, a manually operable device operatively associated with the gate for closure thereof, automatic gate closing mechanism operable without operating said manually operable device while so associated, and a device comprising a fusible member for normally holding said mechanism inoperative, the operation of said manually operable device directly closing said gate without disturbing any of said automatic gate closing mechanism.

2. A shut-off valve comprising a gate, an arm connected thereto, a manually operable member B for operating said arm and gate to close the valve, automatic gate closing mechanism operable without operating said manually operable member B, a device comprising a fusible member for normally holding said mechanism inoperative, the operation of said manually operable member B directly closing the valve without affecting said automatic mechanism.

3. A shut-off valve comprising a pivotally supported gate, a holding means comprising an arm and a fusible member, a gate actuating element 33 normally held ineffective by said holding means, a manually operable slidably mounted member, an arm 22 carried by said gate, engaging means carried by said manually operable member for engaging and directly forcing said gate arm to close the valve without actuating said holding means or gate actuating element 33.

4. A shut-off valve comprising a valve gate, a device comprising a fusible member, a gate actuating spring member normally held ineffective by said device, a manually operable member normally operatively related to said gate for closing said valve gate, said device and gate actuating spring, and said manual member independently operable for closing the valve gate without disturbing the other.

Signed by me at Chicago, county of Cook, and State of Illinois, in the presence of two witnesses.

GEORGE L. BURLINGAME.

Witnesses:
PHIL. T. MENARD,
M. R. ROCHFORD.

Copies of this patent may be obtained for five cents each, by addressing the "Commissioner of Patents, Washington, D. C."